United States Patent
Oh et al.

(10) Patent No.: US 6,201,774 B1
(45) Date of Patent: Mar. 13, 2001

(54) APPARATUS FOR JUDGING OPTICAL DISK

(75) Inventors: Sung Min Oh; Nark Seog Kim, both of Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/222,943

(22) Filed: Dec. 30, 1998

(30) Foreign Application Priority Data

Dec. 30, 1997 (KR) .................................................. 97-79763

(51) Int. Cl.$^7$ ...................................................... G11B 7/095
(52) U.S. Cl. ............................ 369/44.27; 369/54; 369/58
(58) Field of Search .............................. 369/44.27–44.31, 369/54, 58

(56) References Cited

U.S. PATENT DOCUMENTS

| | | | |
|---|---|---|---|
| 4,759,007 | * 7/1988 | Eberly | 369/58 |
| 5,574,714 | * 11/1996 | Masashi et al. | |
| 5,666,340 | * 9/1997 | Macola | 369/58 |
| 5,721,718 | * 2/1998 | Hwang | 369/58 |
| 5,959,955 | * 9/1999 | Choi | 369/58 |
| 5,963,523 | * 10/1999 | Kayama et al. | 369/58 |
| 5,966,357 | * 10/1999 | Ryoo | 369/58 |

OTHER PUBLICATIONS

Patent Abstracts of Japan, vol. 98, No. 12, for JP 10–334574, patent document published Dec. 18, 1998.*

* cited by examiner

Primary Examiner—W. R. Young
(74) Attorney, Agent, or Firm—Sughrue, Mion, Zinn, Macpeak & Seas, PLLC

(57) ABSTRACT

An apparatus for judging an optical disk by detecting a phase difference between E and F signals corresponding to two sub-beam signals detected by an optical pick-up apparatus. The apparatus includes a first comparator for comparing a voltage corresponding to a first sub-beam inputted from the RF amplifier and a previously set reference voltage and selectively outputting a high level signal or a low level signal in accordance with a result of the comparison, a second comparator for comparing a voltage corresponding to a second sub-beam inputted from the RF amplifier with a previously set reference voltage and selectively outputting a high level signal or a low level signal in accordance with a result of the comparison, a gate circuit for outputting a low level signal when two signals inputted from the first comparator and second comparator are identical and outputting a high level signal when two signals outputted from the same are not identical, a controller for judging the type of a disk mounted in the deck in accordance with an output signal inputted from the gate circuit, and a servo unit for controlling the driving of the optical type pick-up apparatus in accordance with a control signal from the controller.

4 Claims, 2 Drawing Sheets

APPARATUS FOR JUDGING OPTICAL DISK

BACKGROUND OF THE INVENTION

1. Field of the Invention

The present invention relates to an apparatus for judging an optical disk, and in particular to an improved apparatus for judging an optical disk which makes it possible to judges the type of an optical disk by detecting a phase difference of E and F signals which are two sub-beams detected by an optical pick-up apparatus.

2. Description of the Conventional Art

Generally, the CD (Compact Disk) is formed by coating a writing medium on one side of the same made of an aluminum. This CD is widely used as a storing medium by emitting a laser beam on the side into which the data are written for thereby reproducing the written data.

As the storing medium which is implemented by emitting a laser beam into the side of the same into which the data are written, a DVD (Digital Video Disk) is known. This DVD has a large storing capacity capable of storing few giga bytes of data including motion pictures. In the future, the DVD will be used for storing the digital data compressed based on MPEG-II and for a high resolution and quality multimedia medium which may run for more than two hours.

FIG. 1 is a view illustrating a comparison between the data written into the conventional CD and DVD.

As shown therein, the disk information is obtained from a protruded surface which is called a pit. In the case of the CD, the minimum size of the pit is N, and in the case of the DVD, the minimum size of the pit is N'(an example of relative distance between pits is shown as M). As a result of the comparison therebetween, since the pit of the CD is smaller by half than the same of the DVD, the DVD is capable of storing more data compared to the CD.

The thickness of the CD is the thickness as the same of the DVD. Thus the fact that the thicknesses of the CD and DVD are the same means that the distance between the disk surface and the reflection surface is same in the CD and DVD, respectively.

Therefore, the optical disk reproducing apparatus with a DVD reproducing function has also a CD reproducing function. In this optical disk reproducing apparatus, a controller provided in the optical disk reproducing apparatus judges whether the optical disk mounted is a CD or DVD, so that the operation of the system is controlled based on the type of the optical disk mounted in the deck of the system.

However, in the optical disk reproducing apparatus with the DVD reproducing function, in the case that an optical disk is mounted into the deck, the type of the optical disk mounted in the deck of the system is judged by reproducing a read-in region of the optical disk. In this case, long read-in time is required for reproducing the read-in region for judging the disk type between the CD and DVD.

SUMMARY OF THE INVENTION

Accordingly, it is an object of the present invention to provide an apparatus for judging an optical disk by detecting a phase difference between E and F signals corresponding to two sub-beam signals detected by an optical pick-up apparatus.

In order to achieve the above objects, there is provided an apparatus for judging an optical disk in accordance with a first embodiment of the present invention which includes an optical type pick-up apparatus for reproducing a data written on an optical disk and outputting a RF signal, a RF amplifier for amplifying the RF signal inputted form the optical type pick-up apparatus to a predetermined level, removing a noise contained in the signal, processing a low pass filtering with respect to the signal, and outputting a predetermined voltage, a first comparator for comparing a voltage corresponding to a first sub-beam inputted from the RF amplifier and a previously set reference voltage and selectively outputting a high level signal or a low level signal in accordance with a result of the comparison, a second comparator for comparing a voltage corresponding to a second sub-beam inputted from the RF amplifier with a previously set reference voltage and selectively outputting a high level signal or a low level signal in accordance with a result of the comparison, a gate circuit for outputting a low level signal when two signals inputted from the first comparator and second comparator are identical and outputting a high level signal when two signals outputted from the same are not identical, a controller for judging the type of a disk mounted in the deck in accordance with an output signal inputted from the gate circuit, and a servo unit for controlling the driving of the optical type pick-up apparatus in accordance with a control signal from the controller.

In order to achieve the above objects, there is provided an apparatus for judging an optical disk in accordance with a second embodiment of the present invention which includes an optical type pick-up apparatus for reproducing a data written on an optical disk and outputting a RF signal, a RF amplifier for amplifying the RF signal inputted form the optical type pick-up apparatus to a predetermined level, removing a noise contained in the signal, processing a low pass filtering with respect to the signal, and outputting a predetermined voltage, a controller for converting two voltages corresponding to two sub-beams inputted from the RF amplifier into a digital signal, comparing the thusly converted digital signal with a previously set reference voltage and judging the type of the disk in accordance with a result of the comparison, and a servo unit for controlling the driving of the optical type pick-up apparatus in accordance with a control signal from the controller.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1:
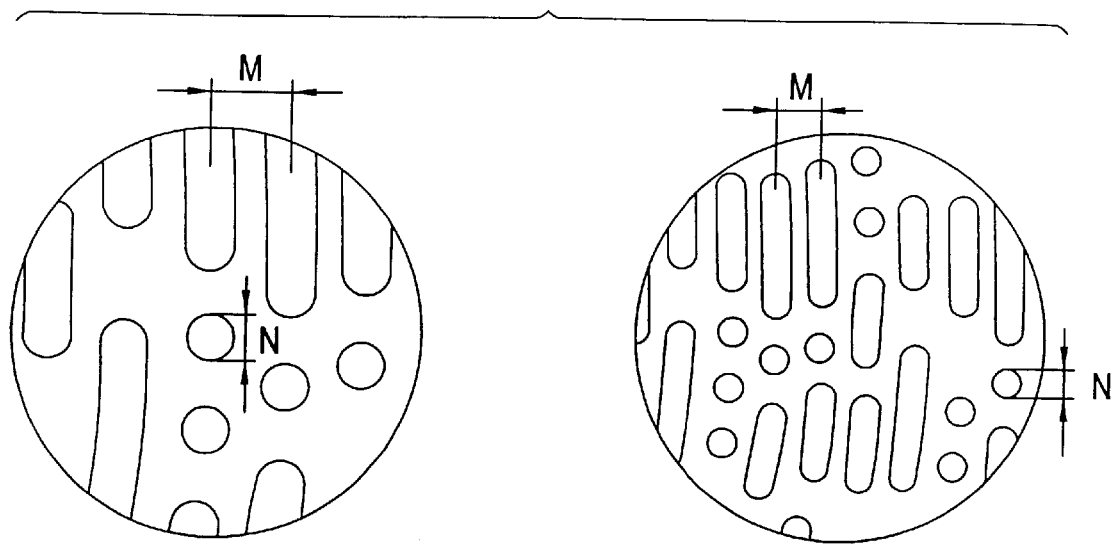
FIG. 1 is a view illustrating a comparison between the data recorded into a conventional CD and DVD.
Figure 2:
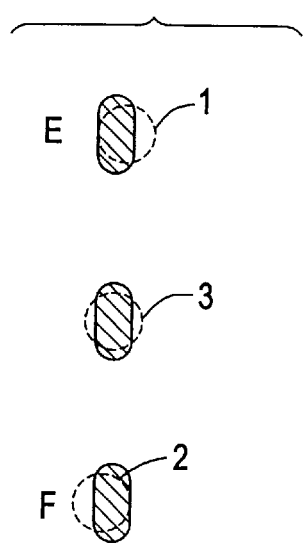
FIG. 2 is a view illustrating two sub-beams formed about a main beam in the conventional art.

FIG. 2 illustrates two sub-beams formed about a main beam. As shown therein, two sub-beams 1 and 2 are formed at upper and lower portions of the main beam 3 respectively, for reproducing a data written.

Figure 3:
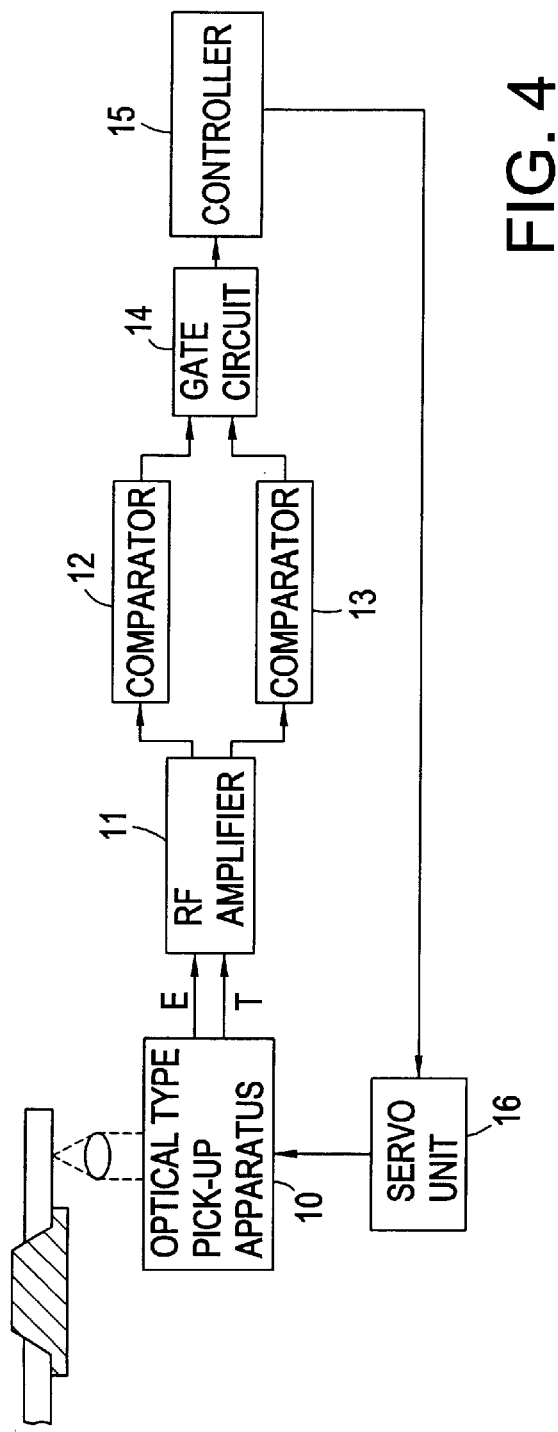
FIG. 3 is a block diagram illustrating the construction of an optical disk judging apparatus according an embodiment of the present invention.

FIG. 3 is a block diagram illustrating the construction of an optical disk Judging apparatus according to a first embodiment of the present invention.

As shown therein, the optical disk Judging apparatus according to the present invention includes an optical type pick-up apparatus 10 for reproducing a data written on an optical disk and outputting a RF signal, a RF amplifier 11 for amplifying the RF signal Inputted from the optical type pick-up apparatus 10, removing a noise, processing a low pass filtering for the signal, and outputting a predetermined voltage, a first comparator 12 for comparing the voltage corresponding to an E signal which is a first sub-beam inputted from the RF amplifier 11 with a previously set reference voltage and selectively outputting a high level signal or a low level signal in accordance with a result of the comparison, a second comparator 13 for comparing the voltage corresponding to a F signal which is a second sub-beam inputted from the RF amplifier 11 with a previously set reference voltage, and selectively outputting a high level signal and a low level signal in accordance with a result of the comparison, a gate circuit 14 for outputting a low level signal when two signals inputted from the first comparator 12 and the second comparator 13 are identical and outputting a high level signal when the same are different, a controller 15 for Judging the type of the optical disk mounted in the deck in accordance with an output signal inputted from the gate circuit 14, and a servo unit 16 for controlling the driving operation of the optical type pick-up apparatus 10 in accordance with a control signal of the controller 15.

Figure 4:
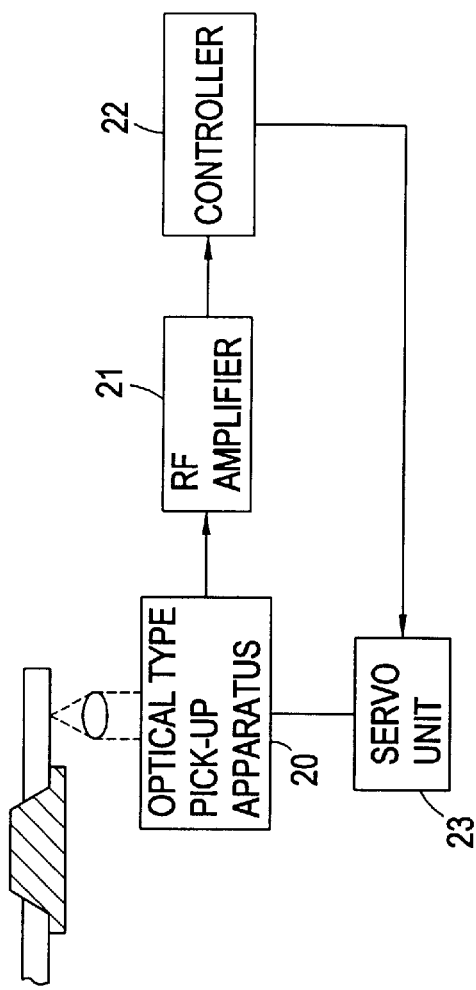
FIG. 4 is a block diagram illustrating the construction of an optical disk judging apparatus according to another embodiment of the present invention.

FIG. 4 illustrates the construction of an optical disk judging apparatus according to a second embodiment of the present invention.

As shown therein, the optical disk judging apparatus includes an optical type pick-up apparatus 20 for reproducing an information written on an optical disk and outputting a RF signal, a RF amplifier 21 for amplifying the RF signal inputted from the optical type pick-up apparatus 20 to a predetermined level, removing a noise, processing a low pass filtering with respect to the signals, and outputting a predetermined voltage, a controller 22 for converting two voltage signals corresponding to E and F signals which are two sub-beams inputted from the RF amplifier 21 into a digital signal, comparing the thusly converted signal with a previously set reference voltage, and judging the type of the disk in accordance with a result of the comparison, and a servo unit 23 for controlling the driving operation of the optical type pick-up apparatus 20 in accordance with a control signal from the controller 22.

The operation of the optical disk reproducing prevention apparatus according to the present invention will be explained with reference to the accompanying drawings.

First, when an optical disk is mounted into the deck, the controller 15, 22 outputs a control signal to the servo unit 16, 23 for driving the optical type pick-up apparatus, the servo unit 16, 23 controls the focusing and tracking in response to a control signal and output the E and F signals, which are the sub-beams, through the focusing-adjusted optical type pick-up apparatus 10, 20 in a state that the tracking is OFF.

The E and F signals inputted through the optical type pick-up apparatus 10 are amplified to a predetermined level by the RF amplifier 11 as shown in FIG. 3, and a noise is removed, and a low pass-filtered voltage is outputted the comparators 12 and 13, respectively.

The comparators 12 and 13 compare a previously set reference voltage with an inputted voltage. As a result of the comparison, if the inputted voltage is higher than the reference voltage, the comparators 12 and 13 output a high level signal to the gate circuit 14.

The gate circuit 14 outputs a low level signal to the controller 15 when two signals from the comparators 12 and 13 are identical, and outputs a high level signal to the controller 15 when two signals are not identical.

Therefore, the controller 15 judges the type of the disk mounted in the deck in accordance with the output signals form the comparators 12 and 13. Namely, the controller 15 judges the mounted optical disk as a DVD when the signal inputted from the gate circuit 14 is a low level, and on the contrary, the controller 15 judges the mounted optical disk as a CD when the signal inputted from the gate circuit 14 is a high level.

The E and F signal inputted through the optical type pick-up apparatus 20 are amplified to a predetermined level by the RF amplifier 21 in another embodiment of the present invention as shown in FIG. 4. After a noise is removed form the signals, the voltage, which is processed with respect to the low pass filtering is inputted into the controller 22 and converted into a digital signal and then is compared with a reference voltage set in the controller 22. If two voltages inputted through the RF amplifier 21 are higher or lower than the previously set reference voltage, the optical disk mounted in the deck is Judged as a DVD, and otherwise, the disk is judged as a CD.

Therefore, in the present invention, in the case that the optical disk mounted in the deck is a CD, the type of the disk is judged using 180° phase difference between the E and F signals corresponding to two sub-beams, resulting in savings in the read-in time for the optical disk reproducing apparatus. In addition, it is possible to effectively prevent a predetermined error in the system and simplify the construction of the circuit.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for judging a type of an optical disk, comprising:

an optical type pick-up apparatus for reproducing a data written on an optical disk and outputting a RF signal;

a RF amplifier for amplifying the RF signal inputted from the optical type pick-up apparatus to a predetermined level, removing a noise contained in the RF signal, processing a low pass filtering with respect to the RF signal, and outputting a first and second predetermined voltages;

a first comparator which performs a first comparison of said first voltage corresponding to a first sub-beam inputted from the RF amplifier and a previously set first reference voltage and selectively outputs a high level first signal or a low level first signal in accordance with a result of the first comparison;

a second comparator which performs a second comparison of said second voltage corresponding to a second sub-beam inputted from the RF amplifier with a previously set second reference voltage and selectively outputs a high level second signal or a low level second signal in accordance with a result of the second comparison;

a gate circuit for outputting a low level third signal when the first and second signals inputted from the first comparator and the second comparator respectively are both high or both low level and outputting a high level third signal when the first and second signals inputted from the first and second comparators, respectively, are not both high level and are not both low level;

a controller for judging the type of the optical disk in accordance with said third signal inputted from the gate circuit; and a servo unit for controlling the driving of the optical type pick-up apparatus in accordance with a control signal inputted from the controller.

2. The apparatus of claim 1, wherein the first and second sub-beams correspond to E and F signals, respectively, and when the first and second voltages corresponding to the first and second sub-beams are larger or smaller than the reference voltage at the same time, the type of the optical disk is judged as a DVD, and when one of the first and second voltages corresponding to the first and second sub-beams is larger than the reference voltage and other of the first and second voltages is smaller than the reference voltage, the type of the optical disk is judged as a CD.

3. An apparatus for judging a type of an optical disk, comprising:

an optical type pick-up apparatus for reproducing a data written on an optical disk and outputting a RF signal;

a RF amplifier for amplifying the RF signal inputted from the optical type pick-up apparatus to a predetermined level, removing a noise contained in the RF signal, processing a low pass filtering with respect to the RF signal, and outputting a first and second predetermined voltages;

a controller which converts the first and second predetermined voltages, respectively corresponding to a first and second sub-beams inputted from the RF amplifier, into a digital signal, performs a comparison of the thusly converted digital signal with a previously set reference voltages and judges the type of the optical disk in accordance with a result of the comparison; and a servo unit for controlling the driving of the optical type pick-up apparatus in accordance with a control signal inputted from the controller.

4. The apparatus of claim 3, wherein the first and second sub-beams correspond to E and F signals, respectively, and when the first and second voltages corresponding to the first and second sub-beams are larger or smaller than the reference voltage at the same time, the type of the optical disk is judged as a DVD, and when one of the first and second voltages corresponding to the first and second sub-beams is larger than the reference voltage and other of the first and second voltages is smaller than the reference voltage, the type of optical disk is judged as a CD.

* * * * *